United States Patent [19]

Reis et al.

[11] Patent Number: 4,822,472
[45] Date of Patent: Apr. 18, 1989

[54] ELECTROLYTIC CELL FOR A DISINFECTION DEVICE

[75] Inventors: August K. Reis, Faistenbergerstr. 1, 8000 München 90; Norbert L. Kirmaier, Aschheim; Meinolf H. A. Schöberl, Prien, all of Fed. Rep. of Germany

[73] Assignee: August K. Reis, Munich, Fed. Rep. of Germany

[21] Appl. No.: 380,238

[22] Filed: May 20, 1982

Related U.S. Application Data

[63] Continuation of Ser. No. 122,561, Feb. 19, 1980, abandoned.

[51] Int. Cl.$^4$ ............................................. C02F 1/46
[52] U.S. Cl. .................................. 204/302; 204/149; 204/284
[58] Field of Search ............................. 204/302–308, 204/149, 186, 284

[56] References Cited

U.S. PATENT DOCUMENTS

| | | | |
|---|---|---|---|
| 2,848,412 | 8/1958 | Easley | 204/302 |
| 3,335,078 | 8/1967 | Mehl | 204/268 |
| 3,368,963 | 2/1968 | Hall | 204/302 |
| 3,923,629 | 12/1975 | Shaffer | 204/260 |
| 3,972,800 | 8/1976 | King | 204/302 |
| 4,188,278 | 2/1980 | Reis | 204/268 |

Primary Examiner—John F. Niebling
Assistant Examiner—William Leader
Attorney, Agent, or Firm—Robert T. Gammons; Robert M. Asher

[57] ABSTRACT

An electrolytic cell of a liquid disinfection device has a housing with an inlet and outlet, and electrodes arranged in transverse planes and surrounding a central supporting element through which electrical leads can be provided. The electrodes can be concentric annular electrodes supported on radial supports, or can be unitary, being punched from sheets with gaps and webs between them.

6 Claims, 4 Drawing Sheets

ELECTROLYTIC CELL FOR A DISINFECTION DEVICE

This is a continuation of application Ser. No. 122,561, filed Feb. 19, 1980, now abandoned.

DESCRIPTION

This invention relates to an electrolytic cell for a disinfection device for disinfecting liquids, in particular water.

In one device of this type, which is disclosed in German Laid-Open Patent Specification No. 2,757,854, electrodes are in planes and are in the form of rods, the ends of which are fixed in the walls of a housing. It is an object of this invention to provide a disinfection device which is easier to construct and more efficient in use.

According to the present invention there is provided an electrolytic cell for a liquid disinfection device comprising a housing having ends, an inlet adjacent or at one end and an outlet adjacent or at the other end, a plurality of electrodes arranged in planes which are transverse of the housing and a central element supporting and surrounded by the electrodes.

Further features and advantages of the invention will be understood from the following description of illustrative embodiments given by way of example only with reference to the accompanying drawings in which.

Figure 1:
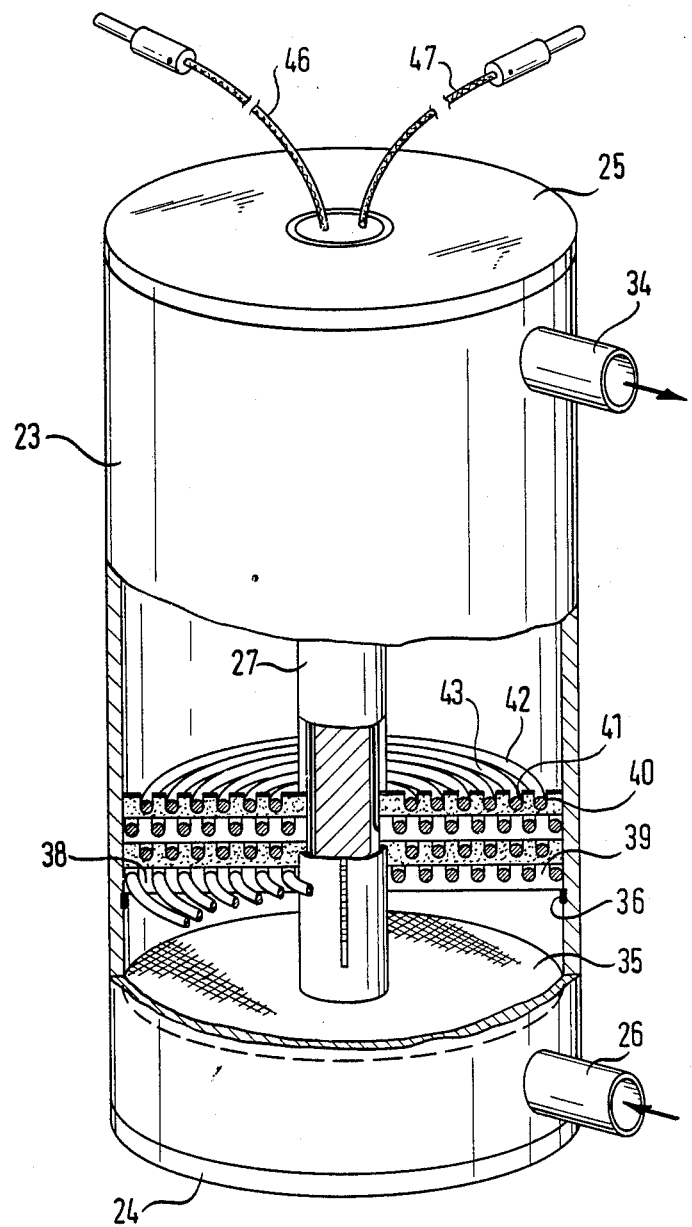
FIG. 1 shows a perspective view of an embodiment of the device of the invention partially cut open.
Figure 2:
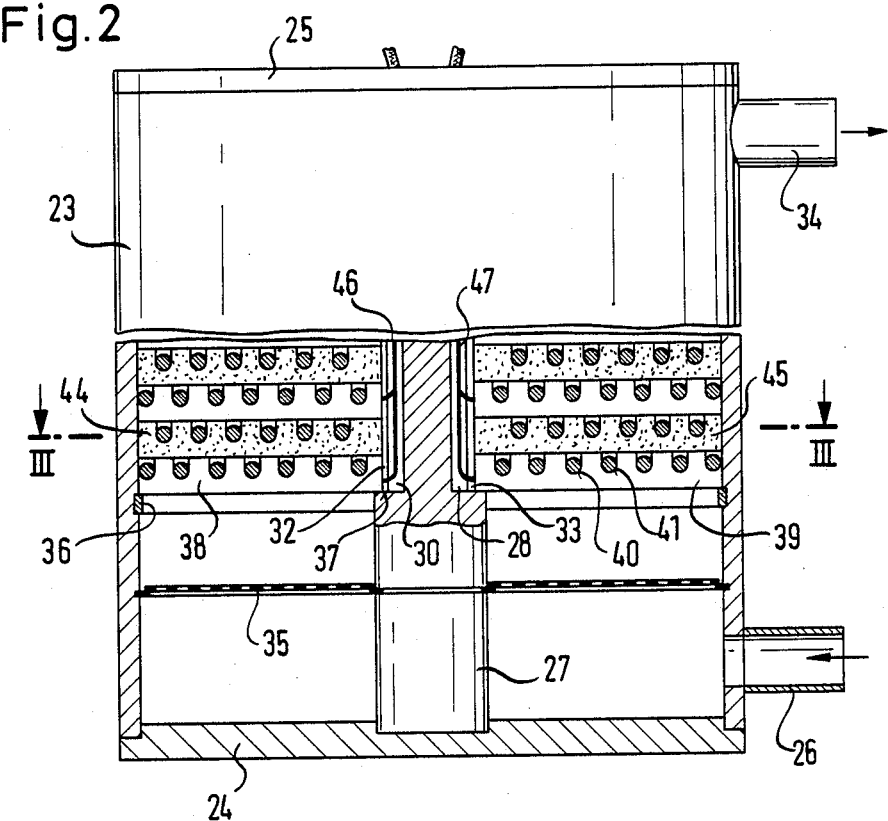
FIG. 2 shows the device of FIG. 1, in a partial section taken perpendicular to the axis of symmetry.
Figure 3:
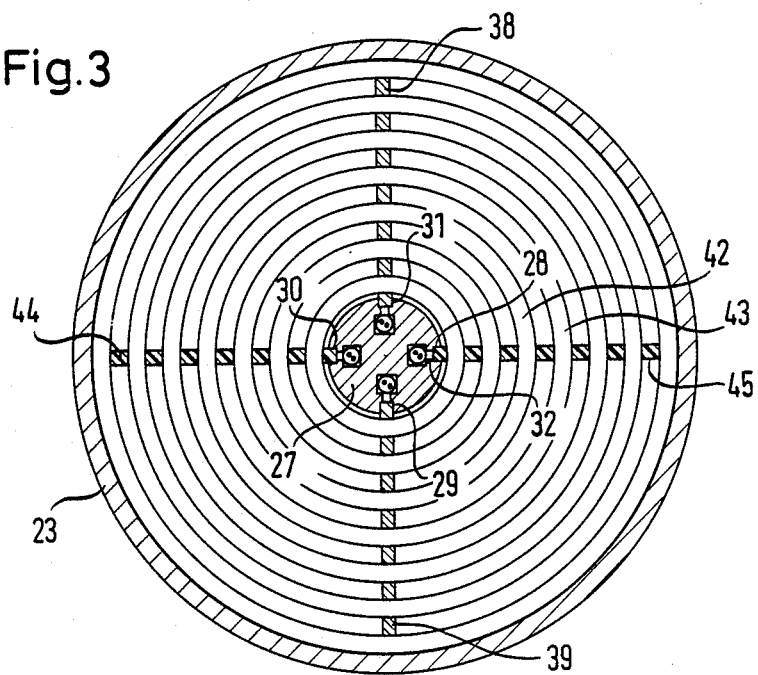
FIG. 3 shows the embodiment shown in FIGS. 1 and 2 in section on the plane III—III of FIG. 2.

In the embodiment of disinfection device shown in FIGS. 1 to 3, a housing 23 is of cylindrical shape with its upper and lower ends closed by means of a base 24 and a cover 25. A circular support column 27 of an insulating material is located in the centre of the cylinder. As can best be seen from FIG. 3, this column has, on its outer surface rectangular longitudinal slots 28–31 which are mutually offset in the peripheral direction by 90°. These slots each have a narrowed radially interior zone 32, 33. An inlet connection 26 for connection to an inlet conduit is provided above the base of the housing and an outlet connection 34 for connection to an outlet conduit is provided at the upper end of the housing. A screen-type flow equaliser 35 is located above the inlet connection 26. A stop ring 36 is provided on the inner wall of the housing at the height of the lower end of the slots 28 to 31 (see FIG. 2)and above the equaliser 35. To assemble this embodiment of disinfection device, spacers 38, 39 and 44, 45 are arranged radially in the manner shown in FIG. 3, on the stop ring and on the lower ends such as 37, FIG. 3, of the longitudinal slots 28–31. The spacers have plane lower and upper seating surfaces and at their upper edges a plurality of equidistantly spaced recesses 40, 41 which serve to receive electrodes 42, 43 of annular shape. The spacers are of two types, conductive spacers 38, 39 and non-conductive spacers 44, 45.

The spacers are arranged in four planes each including the axis of column 27 and spaced 90° from each other. They are also arranged in radial planes, in each of which are two conductive spacers, on one diameter, and two non-conductive spacers on the other diameter. In adjacent radial planes the conductive and non-conductive spacers are angular offset from one another. Thus, in each of the planes including the axis, conductive and non-conductive spacers alternate. The ends of the spacers which are in the slots 28 to 31 are designed in such a way as to contact, with their ends, the narrowed zones 32, 33. The conductive spacers 38, 39 are each connected to electrical leads 46, 47 passed through the slots 28–31. The electric leads pass upwards through the slots and out through the cover part 25. The conductive spacers are, like the leads, preferably made of titanium. The spacers have such a shape that the recesses 40, 41 for receiving the electrodes are mutually offset in a radial sense in successive radial planes in the manner which can be seen from FIG. 2, so that that electrode rings 42, 43 are offset from the rings in adjacent planes and the outermost electrode ring of every second plane is in tight contact with the outer wall of the housing 23. This has the result that all the liquid flowing through between two electrodes has to change direction and is made turbulent. This embodiment is a disinfection device which can be assembled in a particularly simple manner and is nevertheless highly effective.

Figure 4:
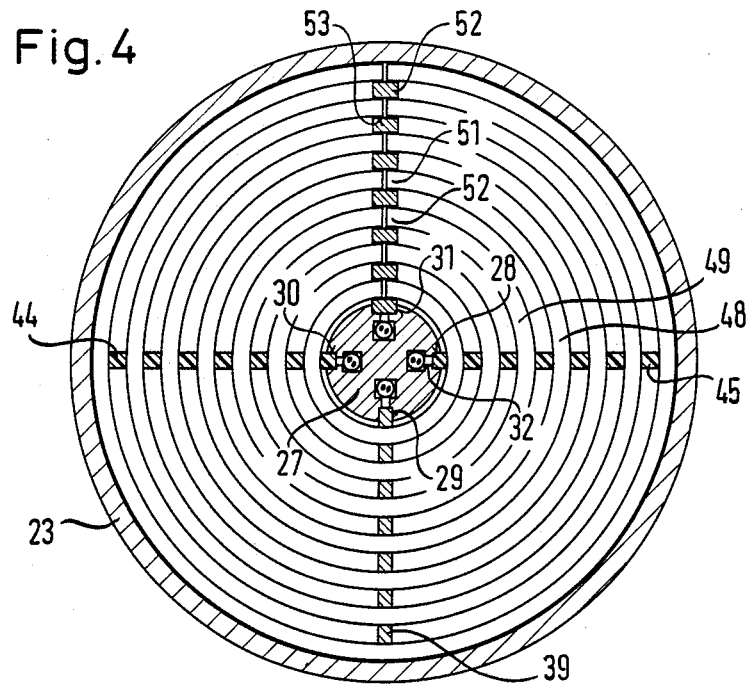
FIG. 4 shows a section, corresponding to that shown in FIG. 3, of a second embodiment.

The structure of the housing and of the support column 27 in the embodiment shown in FIG. 4 is the same as in the first embodiment shown in FIGS. 1 to 3 and like parts are indicated with like reference numerals. In this embodiment, in place of the annular electrode rods 42, 43 there are electrode rods 48, 49 in the shape of open circular rings, that is to say their ends are not welded together. One of the spacers 52, is formed as an elongate rectangular bar and has a plurality of equidistantly spaced bores 53 into which the ends 50, 51 of the electrode rods are pressed in the manner which can be seen from FIG. 4. The other spacers are the same as those of the preceding embodiment. This achieves simultaneously an equidistant arrangement of electrodes and an electrical connection of the latter to the electric leads, and welding of the electrode rods, which are bent into the open circular rings is superfluous.

Figure 5:
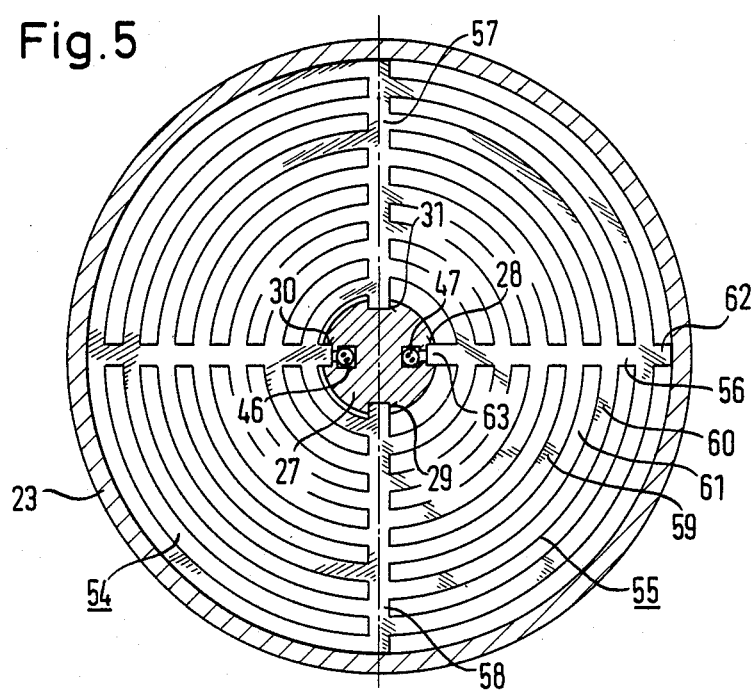
FIG. 5 shows a section, corresponding to that of FIG. 4, of a third embodiment, the section being taken in two parts through successive electrode planes.

The embodiment shown in FIG. 5 in turn differs from that shown in FIGS. 1 to 3 only as to the shape of the electrodes. In place of the individual annular electrode rods held in desired spaced relation by means of spacers, the electrodes 54 and 55 of the successive planes are in this embodiment produced by punching from metal sheets. Each electrode plane is designed in such a way that is has concentric electrode segments such as 59, 60, with vacant zones 61 punched out between them while there are four radial webs such as 56, 57, 58 which are each mutually offset by 90° in the peripheral direction and which are also provided as a result of the punching operation. The radial webs are designed in such a way that they each have a zone 62 resting on an outer spacer at the wall of the housing and a nose 63 engaging in a respective one of the longitudinal slots 28, 29, 30, 31, for connection to the electrical lead. FIG. 5 shows, in the left-hand half an electrode plane which is offset by one plane relative to the electrode plane shown in the right-hand half and it can be seen from the Figure that the electrode segments in successive electrode planes are each offset in the radial direction from one another so that each electrode segment is arranged above a punched-out zone in the plane beneath. In this way, good turbulence is achieved as in the two embodiments described above. On assembly, the lowest electrode plane is placed on a stop ring 36, and the succeeding electrode planes are then arranged one above the other with, in each case, the mutually offset electrode segments and punched-out zones and with simple spacers in between. A connection to the voltage supply can be made by means of the leads 46, 47 passing out through the cover 25 as in the first embodiment.

Figure 6:
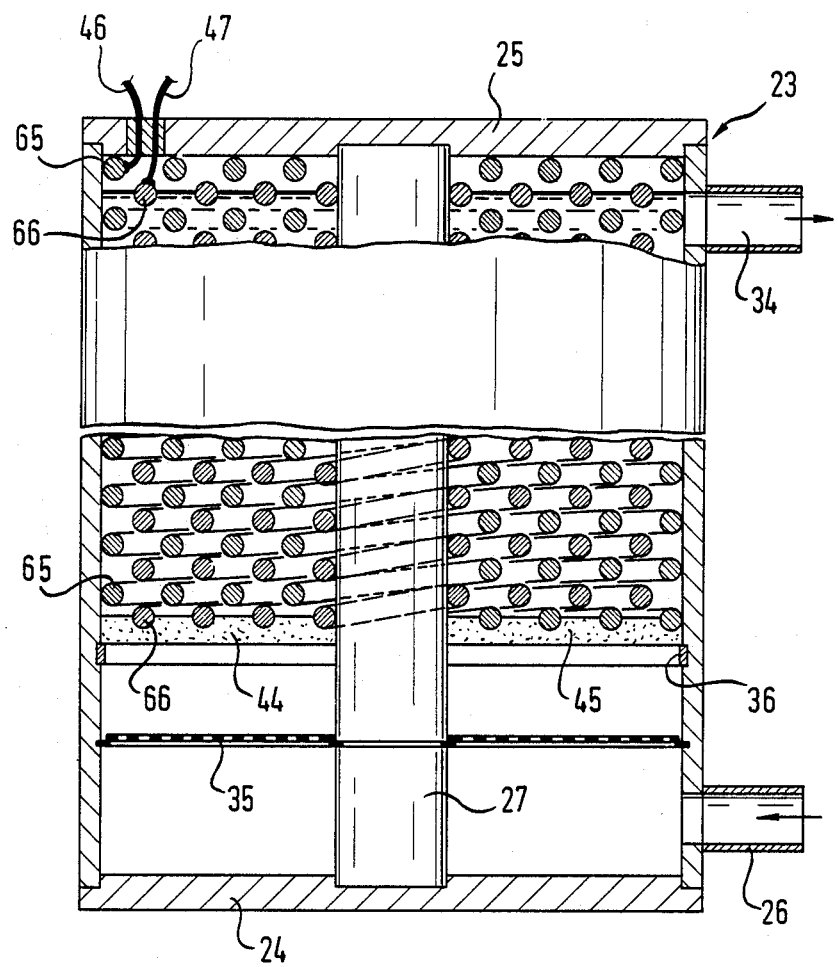
FIG. 6 shows a partial section, perpendicular to the axis of symmetry, of another embodiment of device of the invention.

The embodiment shown in FIG. 6 also has a housing 23 with a base part 24 and a cover part 25 as well as an inlet connection 26 and an outlet connection 34. In the direction of flow and above the inlet connection 26, there is again a flow equaliser 35, the outside of which rests on a stop ring 36a and the centre of which rests on a shoulder on a support column 27. At a distance above the flow equaliser 35, a stop ring 36 is provided on which, as in the embodiment described with reference to FIGS. 1 to 3, non-conductive spacers 44, 45 are located which are mutually offset by 90° in the peripheral direction. There is, however, only a single set of such spacers. The electrodes used in this embodiment are a plurality of cylindrical springs which have different radii and which are arranged concentrically around the support column 27. The innermost cylindrical spring 67 has a diameter such that it is located tightly round the support column 27, whilst the diameter of the outermost cylindrical spring 65 is such that it is in close contact with the wall of the housing 23. The individual springs are each inserted into the housing in such a rotational position that as the section shown in FIG. 6 demonstrates the turns of two adjacent springs 65, 66 are mutually offset by half a pitch in the longitudinal sense of the device. This has the result that the liquid flowing through zones between electrodes is then diverted and that good turbulence is achieved.

In the embodiment shown in FIG. 6, the outlet connection is located below the uppermost turns of the cylindrical springs, these uppermost turns being connected to electrical leads 46, 47, for example by welding. This embodiment has the advantage of a particularly simple and cost-saving construction, the voltage connection can be made in a very simple manner when the cover part 25 is removed.

In the embodiments described above, a cylindrical housing with electrode planes having a circular cross-section was used in each case. In principle, the housing can also have a rectangular or square shape, it being possible to provide a support column and a stop ring in the same manner. The individual electrode rods of the electrode planes, or, in the case of punching, the electrode segments, then likewise have a rectangular or square shape adapted to the internal cross-sectional shape of the housing. Furthermore, in place of the cylindrical springs, helical springs or helical coils with a rectangular or square run can be used as in the embodiment shown in FIG. 6. The making of the contacts and the mutual offsetting of the electrode zones in successive planes are effected in the same way as in the cylindrical illustrative embodiments described above.

In place of the electrode designs described above, the individual planes can also be formed of porous conductive metal. Thus, a sintered material can be used for this purpose, for instance one which is formed by dumping small metal beads, preferably of titanium having a diameter in a range from preferably about 0.5 to about 3 mm, in a layer of a thickness of about 2 to 3 bead diameters and metallically joining them at the contact points. The cross-section of the sintered material thus formed is adapted to the cross-section of the housing and the layers of sintered material are arranged one above the other in the direction of flow, for example by means of spacers. Electrical contact can be made in the illustrative embodiments described above. In place of the sintered material described here, other porous metal layers can also be used, it being necessary for the porosity to be selected in such a way that, on the one hand, a large contact area and, on the other hand, adequate flow through the layers are achieved.

In another embodiment of the invention, the electrode material can be formed from non-rolled expanded metal. This is produced in the conventional manner from a sheet metal panel of an appropriate conductive electrode material by punching and subsequent elongation. A very large active area is achieved with this electrode form and also by the three-dimensional shape produced upon elongation. As a result of this three-dimensional shape, electrode surfaces which are inclined relative to the horizontal are produced, and this has the consequence that a very favourable removal of gas bubbles from the flow passing through is achieved. On assembly, the individual electrode sheets, separated from one another by spacers, can be inserted into the housing, their external shape corresponding to the cross-section of the housing. The electrical supply can be effected as in the illustrative embodiments described above. Preferably, the sheets of successive electrodes are in this case each arranged in such a way that the directions of elongation are mutually offset by 180° so that those zones of one electrode plane, which are the electrode surface zones, are inclined to the horizontal in the opposite direction to those of the next plane. This means that the flow from one plane to the next is always directed at the surface zones, and a large contact effect and good turbulence of the liquid are achieved.

In embodiments with electrode planes of expanded metal or sintered material, the electrode planes can fully correspond to the cross-section of the housing and are self-supporting due to their stability, so that stop rings 36, provided on the wall of the housing, and spacers are sufficient to support them and, if desired, the support column 27 can be omitted if the electrical supply is effected in some other way. Even here, however, the use of the support column 27 makes a particularly favourable connection via the electrical leads 46, 47 possible.

In the embodiments described above, the inlet connection 26 and the outlet connection 34 are provided in the lower part and upper part of the lateral wall. However, the inlet can be provided at the lower base 24 and the outlet 34 in the cover part 25 in such a way that these are mutually aligned in the direction of flow. In this way, the electrolysis cell can be built very simply into an existing pipe.

We claim:

1. Apparatus for treating fluids comprising an electrolytic cell, inlet and outlet openings at the bottom and top of the cell, respectively, in communication with the interior of the cell through which the fluid flows, a centrally-located, vertically-positioned, non-conductive support within the cell, a plurality of arrays of annular electrodes supported about the support in vertically-spaced planes transversely of the cell in non-conductive relation to each other, each array occupying substantially the entire cross-sectional area of the cell such that said arrays collectively compel the fluid to flow in a tortuous path as it passes through from the bottom of the cell to the top thereof to thus effect complete exposure of the fluid to the electrolytic action, each array embodying a plurality of radially-spaced in one plane concentric annular electrodes and conductors connecting the electrodes in the arrays vertically of the support.

2. An electrolytic cell as claimed in claim 1 wherein the electrodes in adjacent planes are offset from one another in the radial direction.

3. An electrolytic cell according to claim 1 wherein there radially-oriented, horizontally-disposed, vertically-stacked spacers positioned diametrically of the support between the arrays of electrodes supporting the latter in vertically-spaced, parallel planes transversely of the cell and wherein in any one plane there are conductive and non-conductive spacers displaced 90 degrees apart and in any two adjacent planes the conductive spacers are displaced 90 degrees apart.

4. An electrolytic cell according to claim 1 wherein each array comprises a single sheet of conductive material defining a plurality of radially spaced-apart, concentric, circular electrodes and wherein in successive arrays the circular electrodes alternate radially and wherein the conductors are connected to the respective sheets.

5. An apparatus for treating fluids comprising a cylindrical electrolytic cell, inlet and outlet openings at the bottom and top of the cell, respectively, in communication with the interior of the cell through which the fluid flows, a centrally-located, vertically-positioned, non-conductive support within the cell, a plurality of concentrically-arranged cylindrical electrode coils of different diameter arranged about the support, said cylindrical electrode coils increasing in diameter from a diameter corresponding to the diameter of the support to the diameter of the cell such that collectively the coils occupy substantially the entire cross-sectional area of the cell to thus compel the fluid to follow a tortuous path from bottom to top, the helices of the coils alternating in successive planes vertically and being uniformly spaced radially in any given plane, mutually offset by 90 degrees with non-conductive spacers supporting the lowermost turns of the coils spaced upwardly from the bottom of the cell, said inlet being positioned at the bottom of the cell below the lowermost turns of the coils and said outlet at the top of the housing being positioned below the uppermost turns of the coils, a flat, foraminous plate constituting a flow equalizer positioned about the support in a horizontal plane between the lowermost turns of the coils and the inlet at the bottom and electrical leads connected to the uppermost turns of the coils.

6. An electrolytic cell as claimed in claim 5 wherein the concentric cylindrical coils are helical springs of different radii.

* * * * *